(12) United States Patent
Nishikawa

(10) Patent No.: US 6,487,092 B2
(45) Date of Patent: Nov. 26, 2002

(54) DC/DC CONVERTER

(75) Inventor: Yukihiro Nishikawa, Tokyo (JP)

(73) Assignee: Fuji Electric Co., Ltd., Kawasaki (JP)

( * ) Notice: Subject to any disclaimer, the term of this patent is extended or adjusted under 35 U.S.C. 154(b) by 0 days.

(21) Appl. No.: 09/861,897

(22) Filed: May 22, 2001

(65) Prior Publication Data

US 2002/0003419 A1 Jan. 10, 2002

(30) Foreign Application Priority Data

May 23, 2000 (JP) ........................................ 2000-150814

(51) Int. Cl.[7] ........................ H02M 5/35; H02M 7/5387
(52) U.S. Cl. ........................................ 363/17; 363/132
(58) Field of Search ............................ 363/21.01, 21.02, 363/21.11, 21.12, 20, 97, 98, 132, 131, 17

(56) References Cited

U.S. PATENT DOCUMENTS

| 4,122,514 A | * | 10/1978 | Amin | 363/124 |
|---|---|---|---|---|
| 5,146,394 A | * | 9/1992 | Ishii et al. | 363/16 |
| 5,430,633 A | * | 7/1995 | Smith | 363/20 |
| 5,448,465 A | * | 9/1995 | Yoshida et al. | 363/15 |
| 5,490,052 A | * | 2/1996 | Yoshida et al. | 363/15 |
| 5,694,304 A | * | 12/1997 | Telefus et al. | 363/20 |

* cited by examiner

Primary Examiner—Rajnikant B. Patel
(74) Attorney, Agent, or Firm—Kanesaka & Takeuchi

(57) ABSTRACT

In a DC/DC converter including a half-wave rectifying circuit of a diode and a capacitor for rectifying a voltage occurring on a secondary side of an insulated transformer, an ON period of one of switch elements has a fixed duration, permitting control of an ON period of the other switch element in order to achieve a constant DC output voltage. Since the switching frequency varies only during the ON period of the controlled switch element, an increase in switching frequency is restrained during a period in which the circuit carries light loads.

5 Claims, 5 Drawing Sheets

DC/DC CONVERTER

BACKGROUND OF THE INVENTION AND RELATED ART STATEMNT

The present invention relates to a DC/DC converter with a half-bridge configuration.

FIG. 5 shows a conventional example. A series circuit of a MOSFET 1 (Metal Oxide Semiconductor Field Effect Transistor) and a MOSFET 2, and a series circuit of capacitors 5 and 6 are connected parallel between positive and negative electrode sides of a DC power supply 7. Also, a reactor 14 and a primary winding of a transformer 11 connected in series are located between a connection point of the MOSFETs and a connection point of the corresponding capacitors. Further, snubber capacitors 3 and 4 are connected parallel to the corresponding MOSFETs. A transformer 11 has two windings on its secondary side, and has a rectifying and smoothing circuit composed of diodes 9 and 15 and a capacitor 10. Moreover, an output voltage detection circuit 12 and a control circuit 13 provide feedback control to maintain a smoothed DC output voltage at a constant value.

In such a circuit, the MOSFETs 1 and 2 are alternately turned on and off with a certain duration of a short-circuit preventing time Td between the turn-on and turn-off to execute switching, so that the switch elements have equal control signal pulse widths. This controls the switching frequency to produce constant DC output voltage.

The operation of the DC/DC converter shown in FIG. 5 will be described with reference to FIG. 6.

When one of the MOSFETs is turned off, the snubber capacitor connected parallel to the MOSFET turned off is charged to a DC power supply voltage Ed by an excitation current flowing through transformer 11, while the snubber capacitor connected parallel to the other MOSFET is discharged to zero voltage. The voltage of the MOSFET that is turned off increases gradually due to charging of the snubber capacitor, achieving zero voltage switching and small turn-off loss. When the voltage across the snubber capacitor becomes zero, a body diode of the other MOSFET becomes electrically conductive. At this time, this MOSFET is turned on, resulting in zero voltage switching and no turn-on loss. Further, the capacitors 5 and 6 and reactor 14 constitute a series resonant circuit, so that a resonant current from the resonant circuit flows through the diodes 9 and 15. Accordingly, the each of the MOSFETs is switched after a current flowing through each of the diodes becomes zero, so that the diodes are subjected to soft recovery, with almost no resulting reverse-recovery loss.

As described above, the MOSFETs have low switching loss while the diodes have low reverse-recovery loss, resulting in improved efficiency for the DC/DC converter.

However, since a DC output voltage is controlled by using a switching frequency, when the circuit carries a light load, the switching frequency rises, increasing switching loss and circuit loss associated with charging or discharging of the snubber capacitors. As a result, efficiency is reduced during the period in which the circuit carries a light load. This will be explained below.

FIG. 7 is a modeled circuit of FIG. 5. In FIG. 7, reference C denotes a parallel capacity of the capacitors 5 and 6, while reference L denotes a series inductance of an inductance of the reactor 14 and a leakage inductance of the transformer 11. Reference Z denotes an equivalent impedance of a load connected to an output terminal. A DC output voltage Vo is shown by Equation (1).

$$Vo=Vs/(1+|\omega L-1/\omega C|^2/|Z|^2)^{1/2} \qquad (1)$$

Equation (1) indicates that as the load decreases, i.e. Z increases, ω must be increased in order to keep the output voltage constant, resulting in increased switching frequency.

A potential at a source terminal of the MOSFET connected to a positive side of a DC power supply differs from that at a source terminal of the MOSFET connected to a negative side of the DC power supply. Thus, a signal for driving the positive-side MOSFET must be insulated by a pulse transformer, or a high-voltage-resistant IC with a level shift function is required, increasing the number of required parts and costs.

It is thus an object of the present invention to provide a DC/DC converter which minimizes an increase in switching frequency while the circuit carries a lighter load, thereby minimizing the need for expensive parts and reducing costs.

Other objects and advantages of the invention will be apparent from the following description of the invention.

SUMMARY OF THE INVENTION

In the first aspect of the invention, a DC/DE converter for a DC power supply is formed of a series circuit including a first switch element and a second switch element, which is connected between a positive electrode side and a negative electrode side of the DC power supply; a transformer having a primary winding connected at one side to a common connection point of the first and second switch elements, and a secondary winding with outputs; at least one capacitor connected between a line extending from the primary winding to the common connection point of the first and second switch elements and one of the positive and negative electrode sides of the DC power supply; a diode connected in series to the secondary winding; and a smoothing capacitor situated across the secondary winding outside the diode. A control circuit is connected to the first and second switch elements for switching ON and OFF the first and second switch elements alternately. The control circuit varies an ON period of the first switch element and switches ON the second switch element for a predetermined period.

The DC/DC converter of the second aspect is based on the first aspect, wherein the control circuit includes a first control section connected to the first switch element for controlling the same, and a second control section connected to the second switch element for controlling the same. The transformer further includes a first auxiliary winding and a second auxiliary winding. Also, the DC/DC converter further includes a first rectifying and smoothing circuit connected parallel to the first auxiliary winding for feeding electric power to the first control section, and a second rectifying and smoothing circuit connected parallel to the second auxiliary winding for feeding electric power to the second control section.

In a DC/DC converter of the third aspect, the DC/DC converter based on the second aspect further includes a first voltage switching-timing detection circuit connected parallel to the first auxiliary winding for generating a first timing signal for switching ON the first switch element when the voltage across the first auxiliary winding changes from a positive voltage to a negative voltage, and a second voltage switching-timing detection circuit connected parallel to the second auxiliary winding for generating a second timing signal for switching ON the second switch element when the voltage across the second auxiliary winding changes from a negative voltage to a positive voltage.

In the fourth aspect of the invention, the DC/DC converter in the third aspect further includes a voltage detection circuit connected to the smoothing capacitor for detecting DC output voltage across the smoothing capacitor. The first control section switches ON the first switch element in response to a first timing signal and varies the ON period of the first switch element to keep a value of the detected DC output voltage constant.

The DC/DC converter of the fifth aspect is based on the third aspect, wherein the second control section switches ON the second switch element in response to a second timing signal and keeps the second switch element switching ON for the predetermined period. The DC/DC converter operates properly even if the circuit carries a light load.

DETAILED DESCRIPTION OF PREFERRED EMBODIMENTS

Figure 1:
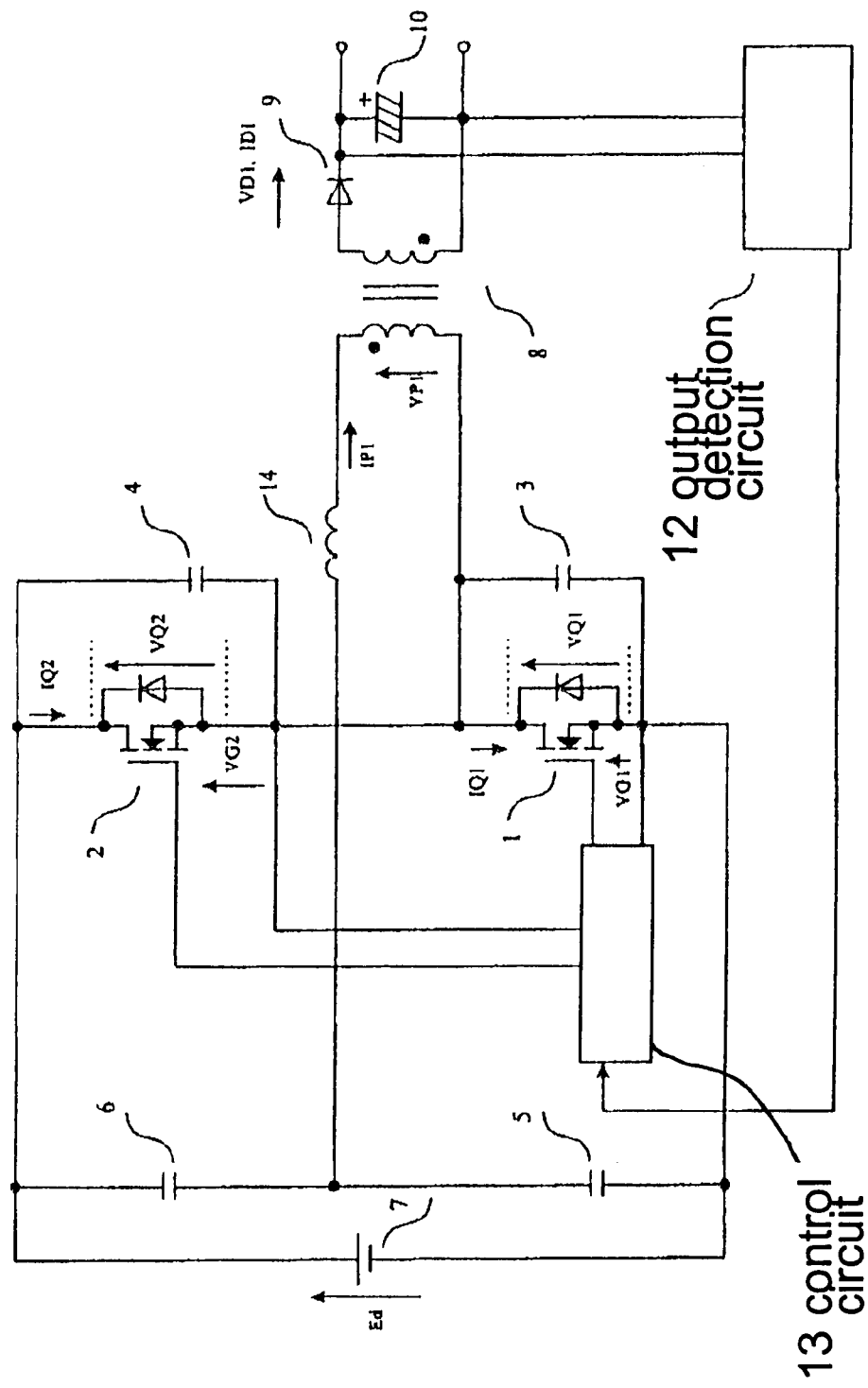
FIG. 1 is a circuit diagram showing a first embodiment of the present invention.
Figure 5:
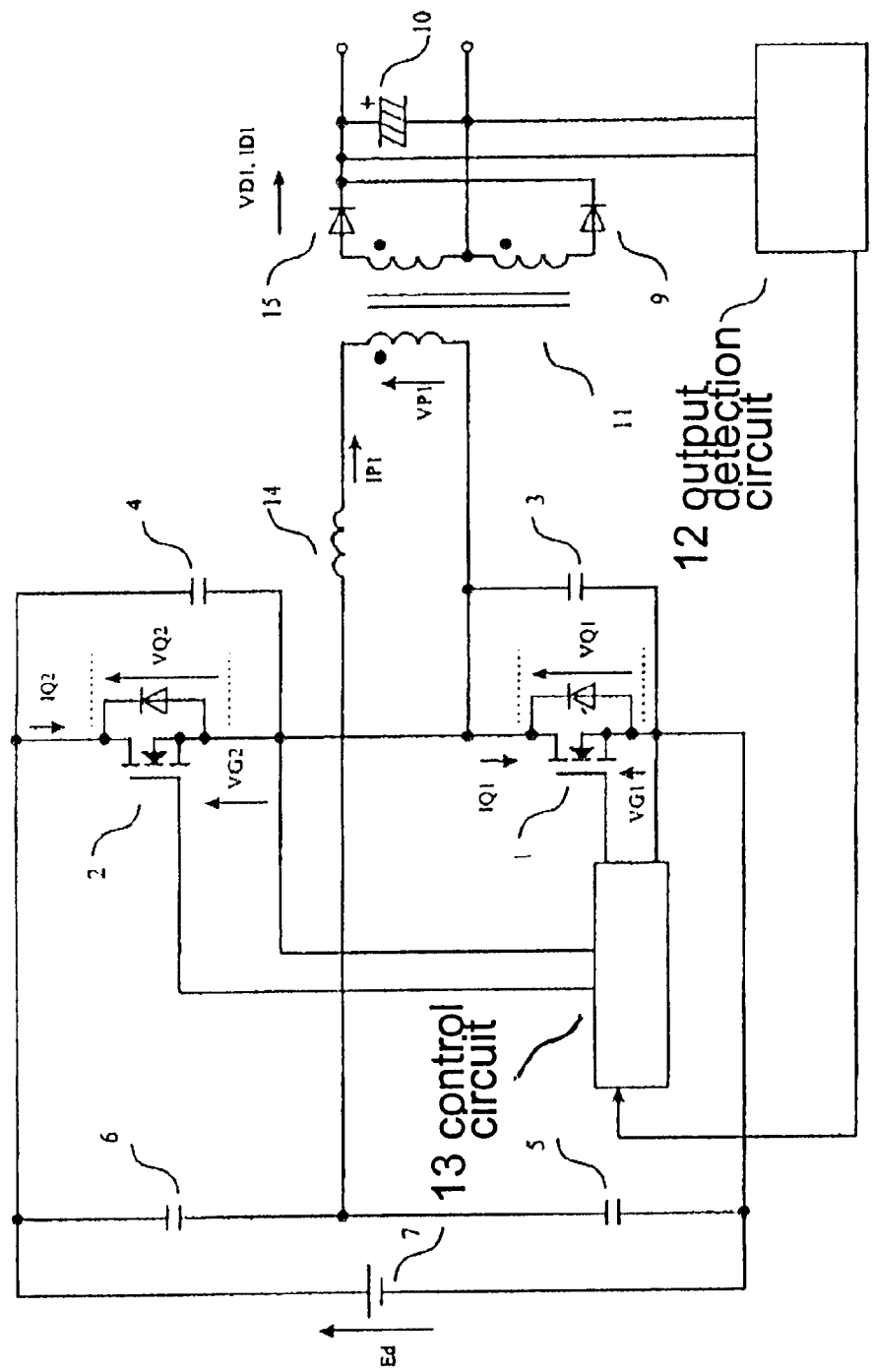
FIG. 5 is a circuit diagram showing a conventional example.
Figure 6:
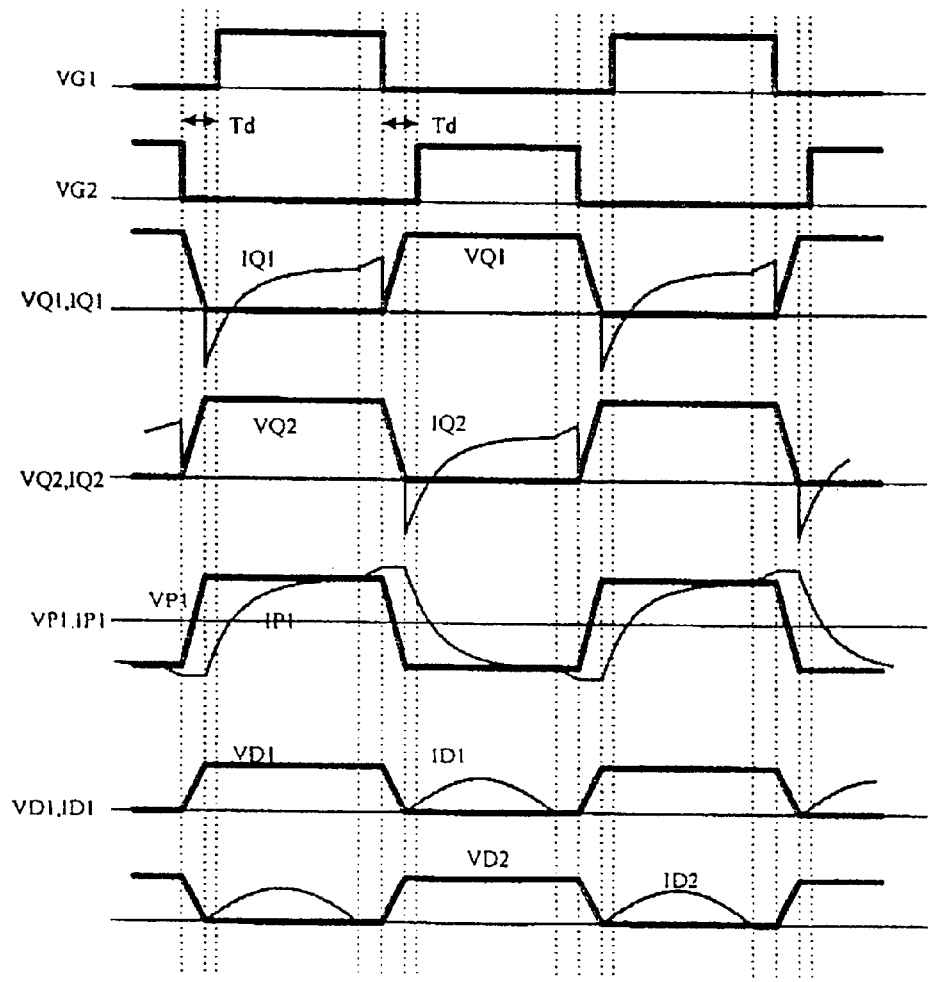
FIG. 6 is an explanatory view for explaining the operation of the circuit in FIG. 5.

FIG. 1 shows a circuit diagram showing a first embodiment of the present invention. In this embodiment, the transformer 11 shown in FIG. 5 is flyback-connected to apply half-wave rectification to a voltage occurring in a secondary winding of this transformer. Transformer 11 may also be forward-connected.

Figure 2:
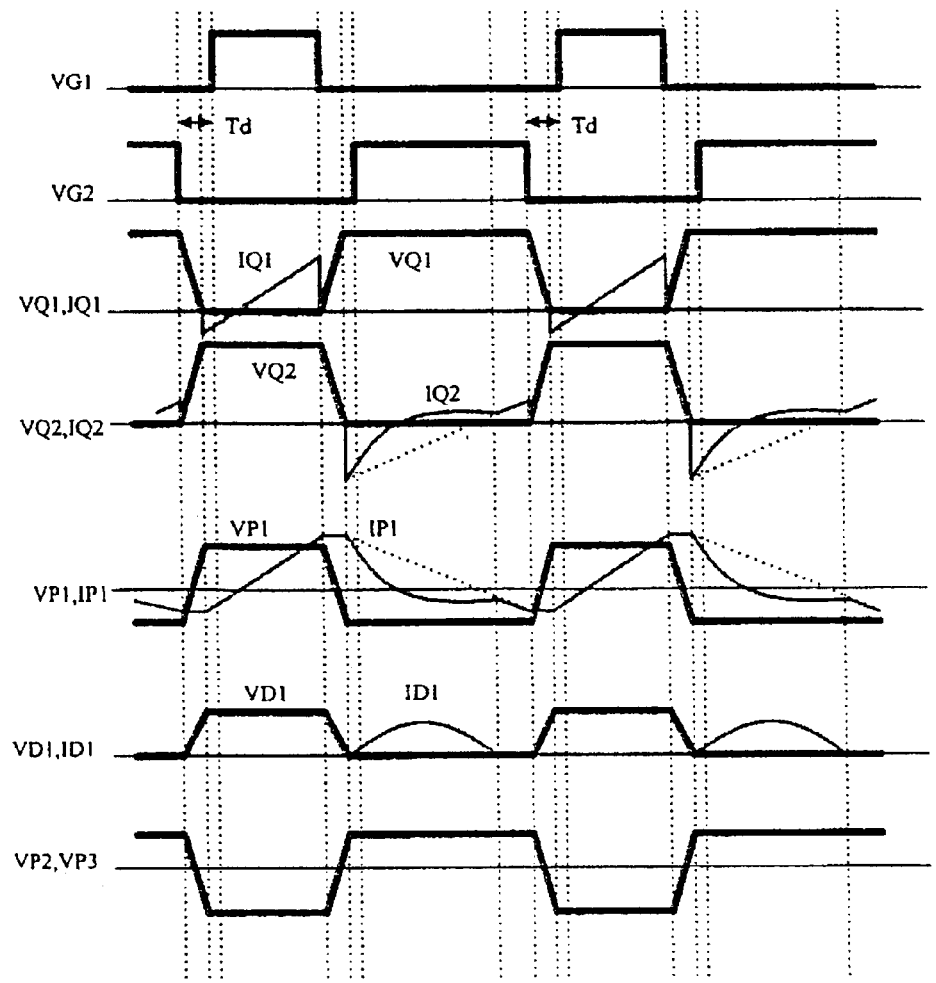
FIG. 2 is an explanatory view for explaining the operation of the present invention.

The operation of the circuit in FIG. 1 will be explained with reference to FIG. 2.

In the circuit in FIG. 1, each MOSFET is alternately turned on and off with a constant short-circuit preventing time Td provided between the turn-on and turn-off to achieve zero voltage switching, as in the conventional example. Further, an ON period of the MOSFET 2 has a fixed duration and is controlled to achieve a constant DC output voltage. Since the transformer is flyback-connected, while the MOSFET 1 is ON, excitation energy is stored in the transformer 8. While the MOSFET 1 is OFF, a resonant current of a sinusoidal wave flows through the diode 9 to supply energy to the DC output side.

An operation allowing each MOSFET to carry out zero voltage switching, an operation for subjecting diode 9 to soft recovery, and other operations are similar to those in FIG. 5. Thus, descriptions thereof are omitted. A reactor 14 may be omitted by using the leakage inductance of the transformer 8.

Figure 3:
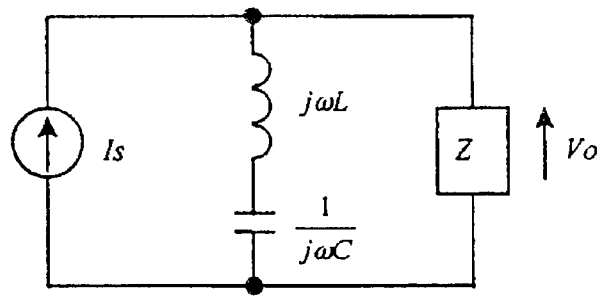
FIG. 3 is an equivalent circuit diagram used to explain the operation of the circuit in FIG. 1.
Figure 7:
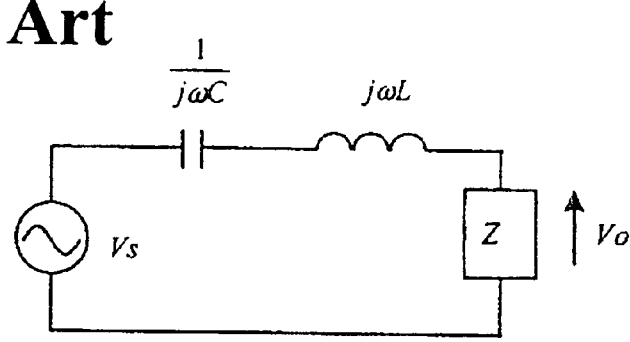
FIG. 7 is a diagram showing a modeled circuit in FIG. 5.

FIG. 3 shows a modeled circuit in FIG. 1. References C, L, and Z shown in FIG. 3 are similar to those in FIG. 7. Since the excitation energy stored in the transformer is supplied to the DC output side, an excitation current may be considered as a current source Is. Then, output voltage Vo is expressed by:

$$Vo = Is/|Y+1/Z| \text{ where } Y=j(\omega L-1/\omega C). \quad (2)$$

Equation (2) indicates that even if the load decreases to increase Z, Is may be controlled to achieve constant DC output voltage, thereby eliminating the need to increase the switching frequency. That is, since the ON period of the MOSFET 2 has a fixed duration and the ON period of the MOSFET 1 is controlled to achieve a constant DC output current, the switching frequency is controlled to vary only during the ON period of the MOSFET 1.

Figure 4:
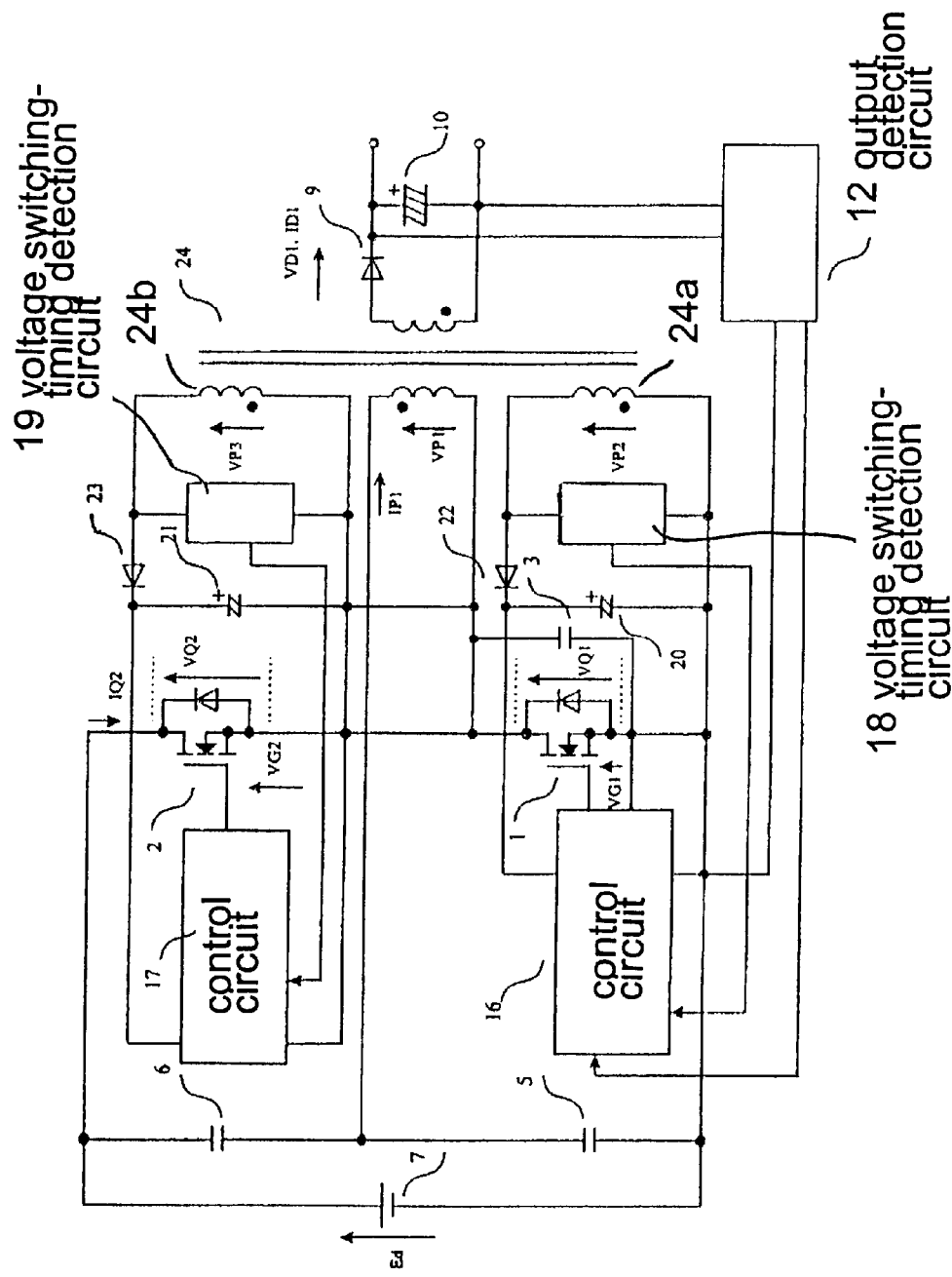
FIG. 4 is a circuit diagram showing a second embodiment of the present invention.

FIG. 4 is a circuit diagram showing a second embodiment of the present invention. This figure shows an example wherein the reactor 14 in FIG. 1 is replaced by the leakage inductance of a transformer 24, and the snubber capacitor 4 in FIG. 1 is omitted.

That is, auxiliary windings are provided in the transformer 8 in FIG. 1 to constitute a transformer 24 with first and second auxiliary windings 24a, 24b, and positive and negative voltages occurring in the auxiliary windings 24a, 24b due to the turn-on and turn-off of the MOSFETs 1 and 2 are subjected to half-wave rectification to obtain a DC power supply for control circuits or section 16 and 17 for controlling the MOSFETs. Further, voltage switching-timing detection circuits 18 and 19 are connected to provide timing signals for turning on the switch elements when the voltage in the corresponding auxiliary windings switches from positive to negative or from negative to positive.

Also, a first rectifying and smoothing circuit formed of a diode 22 and a capacitor 20 is connected parallel to the first auxiliary winding 24a for feeding electric power to the first control circuit 16, and a second rectifying and smoothing circuit formed of a diode 23 and a capacitor 21 is connected parallel to the second auxiliary winding 24b for feeding electric power to the second control circuit 17.

The operation of the circuit in FIG. 4 is explained with reference to FIG. 2. When the MOSFET 1 is turned on to excite the transformer 24 and is then turned off, the snubber capacitor 3 is charged to gradually increase the voltage across the MOSFET 1, while gradually reducing the voltage across the MOSFET 2. Once the voltage across the snubber capacitor 3 reaches the DC power supply voltage Ed, the voltage across the MOSFET 2 becomes zero to make the body diode of the MOSFET 2 electrically conductive. In the meantime, a voltage VP1 on a primary side of the transformer 24 is switched from the positive side to the negative side.

Voltages VP2 and VP3 across the two auxiliary windings are each switched from the negative side to the positive side in the polarities of the illustrated windings because voltages proportional to the voltage VP1 about the winding ratios are generated. When the voltage VP3 is switched from the negative side to the positive side, a voltage switching-timing detection circuit 19 transmits a timing signal to a control circuit 17. While the body diode of the MOSFET 2 is electrically conductive, the control circuit 17 turns on the MOSFET 2 with a zero voltage at a delay following the transmission of the timing signal equal to the duration of the short-circuit preventing period Td. The control circuit also outputs a fixed ON pulse width that turns off the MOSFET 2 after a current flowing through the MOSFET 2 has gradually increased from the negative side up to the positive side.

When the MOSFET 2 is turned off, the excitation current flowing through the transformer 24 discharges the snubber capacitor 3 to gradually reduce the voltage across the MOSFET 1, while gradually increasing the voltage across the MOSFET 2. Once the voltage across the MOSFET 2 reaches the DC power supply voltage Ed, the voltage across the snubber capacitor 3 becomes zero to make the body diode of the MOSFET 1 electrically conductive. In the meantime, the voltage VP1 on the primary side of the transformer 24 is switched from the negative side to the positive side.

The voltages VP2 and VP3 across the two auxiliary windings are each switched from the negative side to the positive side in the polarities of the illustrated windings because voltages proportional to the voltage VP1 about the winding ratios are generated. When the voltage VP3 is switched from the positive side to the negative side, the voltage switching-timing detection circuit 18 transmits a timing signal to the control circuit 16. While the body diode of the MOSFET 1 is electrically conductive, the control circuit 16 turns on the MOSFET 1 with a zero voltage at a delay following the transmission of the timing signal equal to the duration of the short-circuit preventing period Td. The control circuit 16 also detects a feedback signal from the output voltage detection circuit 12 to turn off the MOSFET 1 when the DC output voltage becomes constant.

According to the present invention, the ON period of one of the switch elements has a fixed duration, while the ON period of the other switch element is controlled to achieve a constant DC output voltage, so that switching frequency varies only during the ON period of the MOSFET 1. Consequently, an increase in switching frequency can be restrained when the circuit carries a light load, minimizing any decrease in efficiency during this period.

Further, the transformer has auxiliary windings, and the switch elements can be controlled by detecting timings at which the voltages occurring in the auxiliary windings turn from positive to negative or from negative to positive. As a result, the timings at which the switch elements are turned on are transmitted via the auxiliary windings of the transformer, allowing the configuration of the DC/DC converter using only low-voltage-resistant ICs, without pulse transformers or high-voltage-resistant ICs. The present invention thus makes it possible to build an inexpensive DC/DC converter.

While the invention has been explained with reference to the specific embodiments of the invention, the explanation is illustrative and the invention is limited only by the appended claims.

What is claimed is:

1. A DC/DC converter for a DC power supply, comprising:
    a series circuit including a first switch element and a second switch element, said series circuit being connected directly between a positive electrode side and a negative electrode side of the DC power supply,
    a transformer having a primary winding connected at one side to a common connection point of the first and second switch elements, and a secondary winding with outputs,
    at least one capacitor connected between a line extending from the primary winding to the common connection point of the first and second switch elements and one of the positive and negative electrode sides of the DC power supply,
    a diode connected in series to the secondary winding, and a smoothing capacitor situated across the secondary winding outside the diode so that the diode and capacitor perform a half-wave rectification, and
    a control circuit connected to the first and second switch elements for switching ON and OFF the first and second switch elements alternately, said control circuit switching ON the second switch element for a predetermined fixed period at all times and changing an ON period of the first switch element so that a DC output voltage from the secondary winding is maintained at a constant voltage.

2. A DC/DC converter according to claim 1, wherein said control circuit includes a first control section connected to the first switch element for controlling the same, and a second control section connected to the second switch element for controlling the same; said transformer further includes a first auxiliary winding and a second auxiliary winding; and said DC/DC converter further includes a first rectifying and smoothing circuit connected parallel to the first auxiliary winding for feeding electric power to the first control section, and a second rectifying and smoothing circuit connected parallel to the second auxiliary winding for feeding electric power to the second control section.

3. A DC/DC converter according to claim 2, further comprising a first voltage switching-timing detection circuit connected parallel to the first auxiliary winding for generating a first timing signal for switching ON the first switch element when a voltage across the first auxiliary winding changes from a positive voltage to a negative voltage, and a second voltage switching-timing detection circuit connected parallel to the second auxiliary winding for generating a second timing signal for switching ON the second switch element when a voltage across the second auxiliary winding changes from a negative voltage to a positive voltage.

4. A DC/DC converter according to claim 3, further comprising a voltage detection circuit connected to the smoothing capacitor for detecting the DC output voltage across the smoothing capacitor, said first control section switching ON the first switch element in response to a first timing signal and varying the ON period of the first switch element to keep a value of the detected DC output voltage constant.

5. A DC/DC converter according to claim 3, wherein said second control section switches ON the second switch element in response to a second timing signal and keeps the second switch element switching ON for the predetermined fixed period.

* * * * *